United States Patent [19]
Dames

[11] Patent Number: 6,144,300
[45] Date of Patent: Nov. 7, 2000

[54] SPATIAL MAGNETIC INTERROGATION

[75] Inventor: Andrew Nicholas Dames, Cambridge, United Kingdom

[73] Assignee: Flying Null Limited, Harston, United Kingdom

[21] Appl. No.: 08/930,228

[22] PCT Filed: Apr. 3, 1996

[86] PCT No.: PCT/GB96/00823

§ 371 Date: Jan. 12, 1998

§ 102(e) Date: Jan. 12, 1998

[87] PCT Pub. No.: WO96/31790

PCT Pub. Date: Oct. 10, 1996

[30] Foreign Application Priority Data

Apr. 2, 1995 [GB] United Kingdom ............... 9506909

[51] Int. Cl.[7] .................................................. G08B 13/14
[52] U.S. Cl. ..................... 340/572.2; 235/449; 235/493; 340/572.4; 340/572.6; 340/572.7; 705/29
[58] Field of Search ............................. 340/572.2, 572.4, 340/572.6, 572.7, 686.1, 825.34, 825.35, 825.49, 825.54, 505; 235/375, 381, 385, 493, 449, 450; 148/100, 304, 120, 101; 705/16, 22, 28, 29

[56] References Cited

U.S. PATENT DOCUMENTS

| | | | |
|---|---|---|---|
| 3,964,042 | 6/1976 | Garrott .................................... | 340/551 |
| 3,983,552 | 9/1976 | Bakeman et al. ....................... | 340/572 |
| 4,613,818 | 9/1986 | Battocletti et al. .................... | 324/306 |
| 4,663,612 | 5/1987 | Mejia et al. . | |
| 4,751,516 | 6/1988 | Lichtblau . | |
| 4,960,651 | 10/1990 | Pettigrew et al. ................. | 340/572 X |
| 5,005,001 | 4/1991 | Cordery ............................ | 340/572.2 X |
| 5,017,907 | 5/1991 | Cordery et al. . | |
| 5,126,720 | 6/1992 | Zhou et al. ............................ | 340/572 |
| 5,151,684 | 9/1992 | Johnsen .................................. | 340/572 |
| 5,204,526 | 4/1993 | Yamashita et al. ................... | 235/493 |
| 5,406,262 | 4/1995 | Herman et al. ...................... | 340/572.2 |
| 5,457,382 | 10/1995 | Stein ...................................... | 235/449 |
| 5,539,394 | 7/1996 | Cato et al. ......................... | 340/825.54 |
| 5,594,229 | 1/1997 | Hoshino et al. ......................... | 235/44 |
| 5,729,201 | 3/1998 | Jahnes et al. ........................ | 340/572.1 |

FOREIGN PATENT DOCUMENTS

| | | |
|---|---|---|
| 0295028 | 12/1988 | European Pat. Off. . |
| 0713195 | 5/1996 | European Pat. Off. . |
| 06810 | 7/1989 | WIPO . |

OTHER PUBLICATIONS

Principles Of A Magnetic Method For Labelling Moving Items—By G. Couderchon, et al., Published In IEEE Transactions On Magnetics, vol.Mag. 17, No. 6, Nov. 1981.

*Primary Examiner*—Thomas Mullen
*Attorney, Agent, or Firm*—Oppenheimer Wolff & Donnelly LLP

[57] ABSTRACT

Magnetic tags or markers are disclosed, together with a variety of techniques by means of which such tags may be interrogated. In one aspect, the magnetic marker or tag which is characterized by carrying a plurality of discrete magnetically active regions in a linear array. In another aspect, the invention provides a method of interrogating a magnetic tag or marker within a predetermined interrogation zone, the tag comprising a high permeability magnetic material, for example to read data stored magnetically in the tag or to use the response of the tag to detect its presence and/or to determine its position within the interrogation zone, characterized in that the interrogation process includes the step of subjecting the tag sequentially to: (1) a magnetic field sufficient in field strength to sacurate the high permeability magnetic material, and (2) a magnetic null as herein defined. Applications of such techniques are describer, inter alia, in relation to (a) identifying articles to which tags are attached; (b) accurate determination of position, as in the location of surgical probes; and (c) totalisation of purchases, where cash item carries a tag coded with data representing its nature and its price.

21 Claims, 9 Drawing Sheets

Fig.1.

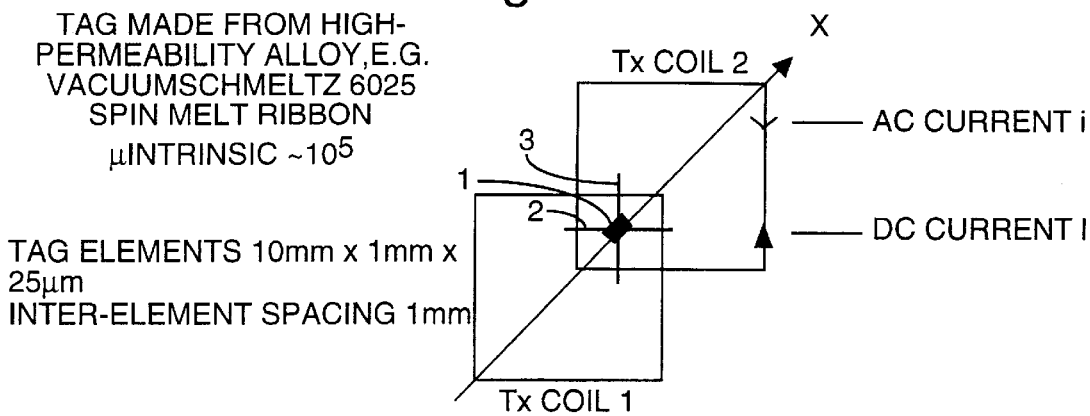

TAG MADE FROM HIGH-PERMEABILITY ALLOY, E.G. VACUUMSCHMELTZ 6025 SPIN MELT RIBBON
$\mu$INTRINSIC ~$10^5$

TAG ELEMENTS 10mm x 1mm x 25$\mu$m
INTER-ELEMENT SPACING 1mm

Tx COIL 1, Tx COIL 2 TYPICALLY 45cm x 45cm, EACH 450 TURNS 0.56mm WIRE.
Tx1, Tx2 SEPARATION ~20cm
TYPICAL CURRENT I =3AMP, i =50mA.
AT MID-POINT PLANE BETWEEN COILS, FIELD IN X DIRECTION IS ZERO (WITH NO AC BIAS APPLIED)

Fig.2.

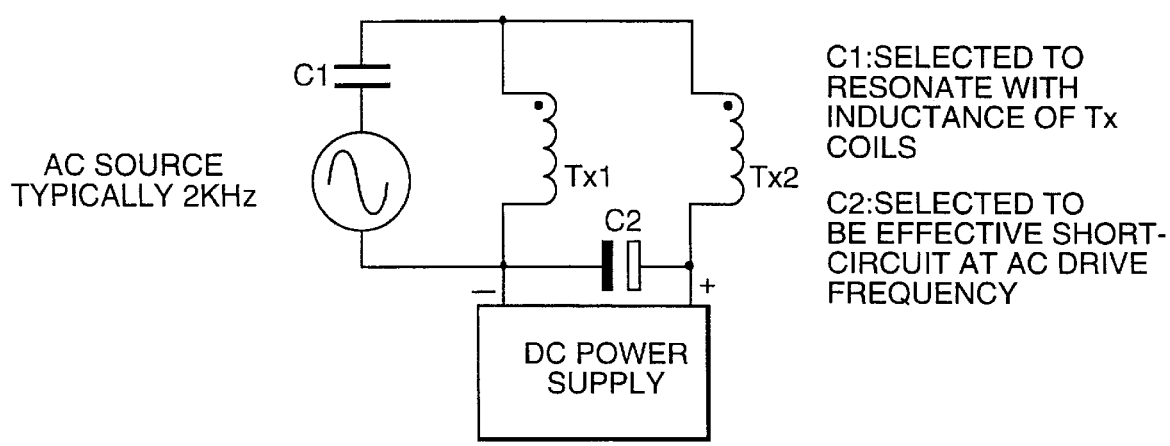

C1: SELECTED TO RESONATE WITH INDUCTANCE OF Tx COILS

C2: SELECTED TO BE EFFECTIVE SHORT-CIRCUIT AT AC DRIVE FREQUENCY

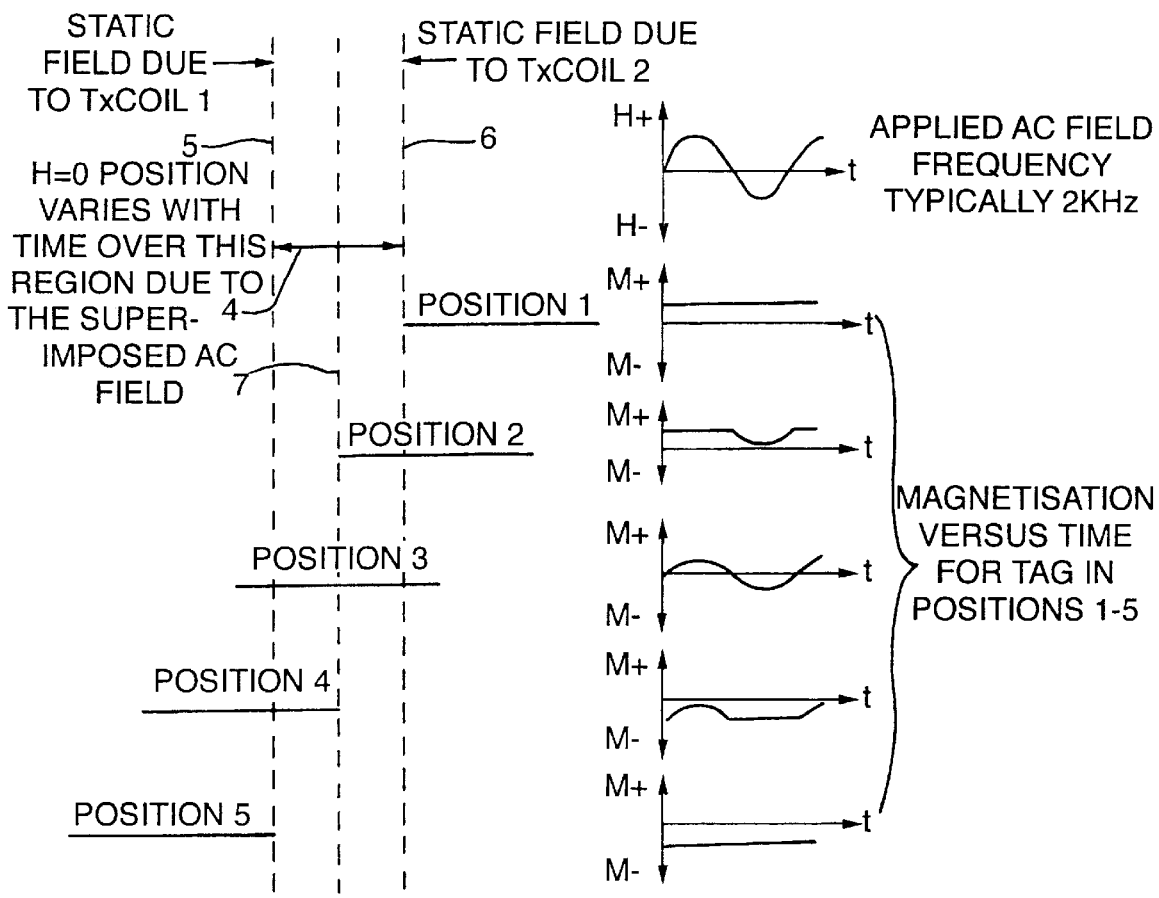
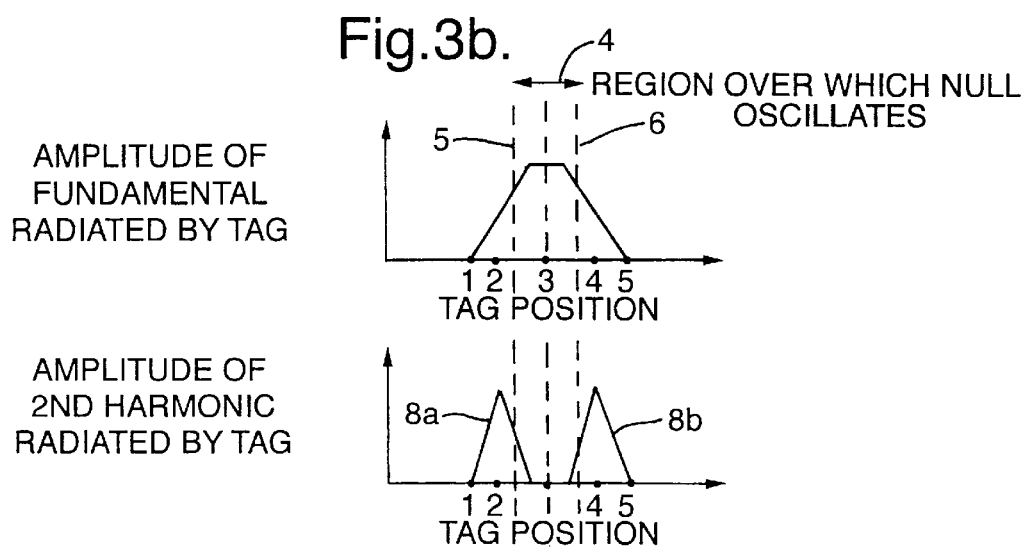

A SIMPLE BAR-MAGNET HAS REGIONS NEAR TO ITS POLES WHERE NARROW NULL PLANES EXIST FOR TAGS WITH THEIR SENSITIVE AXES ALIGNED ORTHOGONAL TO X-Y. PATHS A-B OR C-D CAN BE USED AS THE BASIS OF A SIMPLE INTERROGATOR.

TAGS MAY PASS EITHER THROUGH COIL (PATH C-D) OR OVER COIL (PATH A-B)

TAGS MUST BE ORIENTED WITH THEIR MAGNETIC AXIS IN THE DIRECTION OF THE TAG MOVEMENT

DIRECTION OF TAG MOTION
(MAGNETIC AXIS OF TAG ALIGNED WITH DIRECTION OF MOTION)

POSITION WHERE DISCRETE ELEMENT MAY BE PLACED,OR
HIGH PERMEABILITY REGION CAN BE DEFINED
(MAGNETICALLY,USING BIAS LAYER OR BY OTHER METHODS)

16-BIT TAG

= 111101

TYPICAL DETECTED OUTPUT FROM READER (ADC INPUT)

SPATIAL MAGNETIC INTERROGATION

BACKGROUND OF THE INVENTION

This invention relates to the exploitation of magnetic properties in a range of practical techniques, and utilises a new technique of spatial magnetic interrogation in conjunction with a magnetic marker or identification tag. More particularly, but not exclusively, the invention relates to methods of determining the presence and/or the location of a magnetic marker or tag within an interrogation zone; to methods of identifying a magnetic tag (e.g. identifying a given tag in order to discriminate that tag from others); to systems for putting these methods into practice; to magnetic tags for use in such methods and systems; and to the storage of data in such tags, and the subsequent remote retrieval of data from such tags.

It should be understood that the terms "tag" and "marker" are used herein interchangeably, such devices may be used in many different applications and, depending on the magnetic qualities of the device, may serve to denote (a) the mere presence of the tag (and hence that of an article to which the tag is attached); or (b) the identity of the tag (and hence that of an article to which it is attached); or they may serve to define the precise position of the tag with respect to predetermined co-ordinates (and hence that of an article to which it is attached); or they may serve to provide access codes (e.g. for entry into secure premises; or for ticketing purposes, e.g. on public transport networks); or they may serve generally to discriminate one article or set of articles from other articles.

In addition, the terms "ac field" and "DC field" are used herein to denote magnetic fields whose characteristics are, respectively, those associated with an electrical conductor carrying an alternating current (ac) or a direct current (DC).

The tags, methods and systems of this invention have a wide variety of applications as indicated above. These include (but are not restricted to) inventory control, ticketing, automated shopping systems, monitoring work-in-progress, security tagging, access control, anti-counterfeiting, and location of objects (in particular the precise positioning of workpieces (e.g. probes in surgery).

PRIOR ART

There are a number of passive data tag systems currently available. The most widely-used is based on optically-read printed patterns of lines, popularly known as barcodes. The tag element of such systems is very low-cost, being typically just ink and paper. The readers are also relatively low cost, typically employing scanning laser beams. For may major applications the only real drawback to barcodes is the need for line-of-sight between the reader and the tag.

For applications where line-of-sight is not possible, systems not employing optical transmission have been developed. The most popular employ magnetic induction for coupling between the tag and the interrogator electronics. These typically operate with alternating magnetic fields in the frequency range of 50 kHz to 1 MHz, and generally employ integrated electronic circuits ("chips") to handle receive and transmit functions, and to provide data storage and manipulation. In order to avoid the need for a battery, power for the chip is obtained by rectification of the interrogating signal received by an antenna coil. In order to increase the power transferred, and to provide discrimination against unwanted signals and interference, the coil is usually resonated with a capacitor at the frequency of the interrogation signal carrier frequency. A typical product of this type is the TIRIS system manufactured by Texas Instruments Ltd.

Other multi-bit data tag systems have employed conventional h.f. radio technology, or technologies based on surface acoustic waves or magnetostriction phenomena.

FIELD OF THE INVENTION

The present invention involves, inter alia, the use of a new type of passive data tag system which employs small amounts of very high-permeability magnetic material, and a scanned magnetic field for interrogation. Since the magnetic material can be in the form of a thin foil, wire or film, it can be bonded directly to a substrate, e.g. paper or a plastics material, to form self-supporting tags.

Alternatively, the magnetic material may be incorporated into the structure of an article with which the tag is to be associated; thus a tag may be formed in situ with the article in question by applying the magnetic material to the surface of the article, or by embedding the magnetic material within the body of the article.

The invention exploits magnetic fields which contain a "magnetic null"—this term is used herein to mean a point, line, plane or volume in space at or within which the component of the magnetic field in a given linear direction is zero. The volume in space over which this condition is met can be very small—and this gives rise to certain embodiments of the invention in which precise position is determined. Typically the magnetic null will be extant over a relatively small linear range. It should be understood that, where there is a magnetic null, it is possible (and is often the case) that the magnetic field component in a direction orthogonal to the given linear direction will be substantial. In some embodiments of this invention, such a substantial orthogonal field is desirable.

One way of creating the magnetic null is to employ opposing magnetic field sources. These may be current-carrying coils of wire, or permanent magnets (these being well suited to small-scale systems), or combinations of coil(s) and permanent magnet(s). It is also possible to exploit the magnetic nulls which exist in specific directions when a single coil or permanent magnet is used.

For large scale applications, the magnetic field sources are preferably coils carrying direct current.

The invention also utilises the relative movement between a magnetic marker and an applied magnetic field in order to effect passage over the marker of the magnetic null. This can be achieved by moving the marker with respect to the applied magnetic field, or by holding the marker in a fixed position while the magnetic field is scanned over it. Generally, the invention exploits the difference between the magnetic behaviour of the marker in (i) a zero field (at the magnetic null), and (ii) in a high, generally saturating, magnetic field.

TAGS OF THIS INVENTION

According to one aspect of the present invention there is provided a magnetic marker or tag which is characterised by carrying a plurality of discrete magnetically active regions in a linear array. The discrete magnetically active regions may be supported on a substrate, e.g. paper or a plastics material, or they may be self-supporting. Alternatively, the magnetic elements may be incorporated directly into or onto articles during manufacture of the articles themselves. This is appropriate, for example, when the articles are goods, e.g. retail goods, which carry the tags for inventory purposes; or when the articles are tickets or security passes.

A tag as defined above can also be formed from a continuous strip of high permeability material, discrete regions of which have their magnetic properties permanently or temporarily modified. It will be appreciated that such a process can begin with a high permeability strip selected regions of which are then treated so as to modify their magnetic properties, generally by removing or reducing their magnetic permeability; or with a strip of high permeability magnetic material accompanied by a magnetisable strip positioned close to the high permeability magnetic material, e.g. overlying it or adjacent to it, selected regions of which are magnetised. In relatively simple embodiments, each magnetically active region has the same magnetic characteristics; in more complex embodiments, each magnetically active region can possess a different magnetic characteristic, thus making it possible to assemble a large number of tags each with unique magnetic properties and hence with a unique magnetic identity and signature (when processed by a suitable reader device).

Because the invention utilises relative movement between a tag and an applied magnetic field, it will be appreciated that there will be a correspondence between the time domain of output signals from a tag reading device and the linear dimensions of the magnetically active regions of a tag and of the gaps between the magnetically active regions. In this sense, the active regions and the gaps between them function analogously to the elements of an optical bar code (black bar or white gap between adjacent bars). It follows from this that, just as variability of magnetic characteristics in the active regions can be used to generate part of a tag "identity", so can the linear spacing between adjacent magnetically active regions. It will readily be understood that a vast number of tags, each with its own unique identity, can thus be produced in accordance with this invention.

Although the tags have been described as processing a linear array of magnetically active regions, the tags may in fact have two or more such linear arrays. These may be disposed mutually parallel, or mutually orthogonal, or in any desired geometrical arrangement. For simplicity of reading such tags, arrays which are parallel and/or orthogonal are preferred.

Appropriate techniques for manufacturing the tags of this invention are well-known in conventional label (i.e. magnetic marker) manufacture. Suitable magnetic materials are also well-known and widely available; they are high-permeability materials which preferably have an extrinsic relative permeability of at least $10^3$. The coercivity of the magnetic material will depend on the tag's intended use. The magnetic material is preferably in the form of a long thin strip or of a thin film; these formats avoid major internal demagnetisation effects. Suitable strip materials are readily available from commercial suppliers such as Vacuumschmeltze (Germany), Allied Signal Corp. (USA), and Unitika (Japan). Thin film material currently manufactured in high volume by IST (Belgium) for retail security tag applications is also suitable for use in this invention.

DETECTION/IDENTIFICATION METHODS

As well as the tags defined above, the present invention provides a variety of useful methods for detecting the presence of a magnetic marker and/or for identifying such a marker. While in many cases these methods will be intended for use in conjunction with the tags of the invention, this is not a necessary prerequisite in the methods of the invention.

According to a second aspect of the invention, there is provided a method of interrogating a magnetic tag or marker within a predetermined interrogation zone, the tag comprising a high permeability magnetic material, for example to read data stored magnetically in the tag or to use the response of the tag to detect its presence and/or to determine its position within the interrogation zone, characterised in that the interrogation process includes the step of subjecting the tag sequentially to: (1) a magnetic field sufficient in field strength to saturate the high permeability magnetic material, and (2) a magnetic null as herein defined.

Preferably the magnetic null is caused to sweep back and forth over a predetermined region with the interrogation zone. The scanning frequency (i.e. the sweep frequency of the magnetic null) is preferably relatively low, e.g. 1–500 Hz. Conveniently, the field pattern is arranged so that (a) said magnetic null lies in a plane; and (b) the saturating field occurs adjacent of said plane.

According to a third aspect of this invention, there is provided a method of determining the presence and/or the position of a magnetic element within a predetermined interrogation zone, the magnetic element having predetermined magnetic characteristics, which method is characterised by the steps of: (1) establishing within said interrogation zone a magnetic field pattern which comprises a relatively small region of zero magnetic field (a magnetic null) contiguous with regions where there is a magnetic field sufficient to saturate the, or a part of the, magnetic element (the saturating field), said relatively small region being coincident with a region through which the magnetic element is passing, or can pass, or is expected to pass; (2) causing relative movement between said magnetic field and said magnetic element such that said magnetic null is caused to traverse at least a part of the magnetic element in a predetermined manner; and (3) detecting the resultant magnetic response of the magnetic element during said relative movement.

According to a fourth aspect of the present invention, there is provided a method of identifying a magnetic element which possesses predetermined magnetic characteristics, which method is characterised by the steps of: (1) subjecting the magnetic element to a first magnetic field which is sufficient to induce magnetic saturation in at least a part of the magnetic element; (2) next subjecting the magnetic element to conditions of zero magnetic field (i.e. a magnetic null), the zero field occupying a relatively small volume and being contiguous with said first magnetic field; (3) causing relative movement between the applied magnetic field and said magnetic element such that said magnetic null is caused to traverse at least a part of the magnetic element in a predetermined manner; and (4) detecting the resultant magnetic response of the magnetic element during said relative movement.

In the identification method defined above, the magnetic element is advantageously caused to traverse an interrogation zone within which the required magnetic conditions are generated.

In a fifth aspect, the invention provides a method of identifying a magnetic element, the magnetic element having predetermined magnetic characteristics, which method is characterised by the steps of: (1) causing the magnetic element to enter an interrogation zone within which there is established a magnetic field pattern which comprises a relatively small region of zero magnetic field (a magnetic null) contiguous with regions where there is a magnetic field sufficient to saturate the, or a part of the, magnetic element (the saturating field); (2) causing the magnetic element to be moved through the saturating field until it reaches the magnetic null; (3) causing relative movement between said magnetic field and said magnetic element such that said magnetic null is caused to traverse at least a part of the magnetic element in a predetermined manner; and (4) detecting the resultant magnetic response of the magnetic element during said relative movement.

The relative movement between the magnetic element and the magnetic field may advantageously be produced by sweeping the applied magnetic field over the magnetic element. Alternatively, the relative movement can be achieved by the application of an alternating magnetic field to a generally static magnetic field pattern.

In carrying out the methods defined above, preferred embodiments of the magnetic element are either elongate, and the magnetic null is then arranged to extend along the major axis of said magnetic element; or they are in the form of a thin film, in which case the magnetic null is arranged to extend to be aligned with the axis of magnetic sensitivity of the thin film material.

The material field or field pattern utilised in the methods defined above may be established by the means of two magnetic fields of opposite polarity. This can conveniently be achieved by use of one or more coils carrying direct current; or by the use of one or more permanent magnets; or by a combination of coil(s) and magnet(s).

Where a coil is used, it may be arranged to carry a substantially constant current so as to maintain the magnetic null at a fixed point. Alternatively, the coil(s) carry/carries a current whose magnitude varies in a predetermined cycle so that the position of the magnetic null is caused to oscillate in a predetermined manner. We describe this as a "flying null". A similar arrangement can be used to give a flying null when both a coil or coils and a permanent magnet are used.

According to a further aspect of the present invention, there is provided a method of determining the presence and/or the position of a magnetic element, which is characterised by the steps of: (1) applying a magnetic field to a region where the magnetic element is, or is expected to be, located, said magnetic field comprising two opposed field components, generated by magnetic field sources, which result in a null field (a magnetic null) at a position intermediate said magnetic field sources (which position is known or can be calculated); (2) causing relative movement between said magnetic field and said magnetic element; and (3) detecting the resultant magnetic response of the magnetic element during said relative movement.

Relative movement between the magnetic field and the magnetic element may be achieved by applying a relatively low amplitude alternating magnetic field superimposed on the DC field. Typically, such a low amplitude alternating magnetic field has a frequency in the range from 10 Hz to 100 kHz, preferably from 50 Hz to 50 kHz, and most advantageously from 500 Hz to 5 kHz.

In one embodiment, the coils carry a substantially constant current so as to maintain the magnetic null at a fixed point. In another embodiment, the coils carry a current whose amplitude varies in a predetermined cycle so that the position of the magnetic null is caused to oscillate in a predetermined manner.

In the methods according to this invention, detection of the magnetic response of the magnetic element advantageously comprised observation of harmonics of the applied AC field which are generated by the magnetic element as its magnetisation state is altered by passing through the magnetic null.

As indicated above, the system operates with a zero or very low frequency scanning field, and an HF (high frequency) in the range 50 Hz–50 kHz. This allows for good signal penetration through most materials including thin metal foils. In addition, international regulations allow high fields for transmission at these low frequencies.

Preferred embodiments of the invention provide a multi-bit data tag system which employs low-frequency inductive magnetic interrogation, and avoids the need for complex, expensive tags.

According to another aspect of the present invention, there is provided a method of coding and/or labelling individual articles within a predetermined set of articles by means of data characteristic of the articles, e.g. article price and/or the nature of the goods constituting the articles, which method is characterised by applying to each article a magnetic tag or marker carrying a predetermined arrangement of magnetic zones unique to that article or to that article and others sharing the same characteristic, e.g. article price or the nature of the goods constituting the article, said magnetic tag or marker being susceptible to interrogation by an applied magnetic field to generate a response indicative of the magnetic properties of the tag or marker and hence indicative of the nature of the article carrying the magnetic tag or marker.

FUNDAMENTALS OF THE INVENTION

Before describing further embodiments, its will be helpful to explain some fundamental aspects of the invention giving reference, where appropriate, to relatively simple embodiments.

A key aspect of the invention is the form of the magnetic field created in the interrogation zone; as will become apparent later, this field allows very small spatial regions to be interrogated. The means for generating this magnetic field will be termed hereinafter an "interrogator". In one simple form, the interrogator consists of a pair of closely-spaced identical coils arranged with their axes coincident. The coils are connected together such that their winding directions are opposed in sense, and a DC current is passed through them. This causes opposing magnetic fields to be set up on the coils' axis, such that a position of zero field—a magnetic null—is created along the coil axis, mid-way between the coils. The level of current in the coils is such as to heavily saturate a small sample of high permeability magnetic material placed at the centre of either of the two coils. A much lower amplitude AC current is also caused to flow in opposite directions through the two coils, so that the AC fields produced sum together mid-way between the coils. This can easily be arranged by connecting a suitable current source to the junction of the two coils, with a ground return. The frequency of this AC current may typically be about 2 kHz, but its value is not critical, and suitable frequencies extend over a wide range. This AC current generates the interrogating field which interacts with a magnetic tag to generate a detectable response. Another effect of this AC current is to cause the position of zero field—the magnetic null—to oscillate about the mid-way position along the coils' axis by a small amount (this is a wobble or oscillation rather than an excursion of any significant extent).

In addition, a further, low frequency AC current may be fed to the coils so as to generate a low frequency scanning field (which may be zero). The frequency of the scanning field (when present) should be sufficiently low to allow may cycles of the relatively high frequency interrogation field to occur in the time that the magnetic null region passes over the tag; typically, the frequency ratio of interrogating field ($\omega_g$) to the scanning field ($\omega_g$) is of the order to 100:1, although it will be appreciated that this ratio can vary over a considerable range without there being any deleterious effect on the performance of the invention.

When a tag containing a piece of high-permeability magnetic material is passed along the coils axis through the region over which oscillation of the magnetic zero plane occurs, it will initially be completely saturated by the DC magnetic field. It will next briefly be driven over its B–H loop as it passes through the zero field region. Finally it will become saturated again. The region over which the magnetic material is "active", i.e. is undergoing magnetic changes, will be physically small, and is determined by the amplitude of the DC field, the amplitude of the AC field, and the characteristics of the magnetic material. This region can easily be less than 1 mm in extent. If the level of the alternating field is well below that required to saturate the magnetic material in the tag, then harmonics of the AC signal will be generated by the tag as it enters the zero field region of interrogator field and responds to the changing field. As the tag straddles the narrow zero field region the tag will be driven on the linear part of its B–H loop, and will interact by re-radiating only the fundamental interrogation frequency. Then, as the tag leaves the zero field region, it will again emit harmonics of the interrogation field frequency. A receiver coil arranged to be sensitive to fields produced at the zero field region, but which does not couple directly to the interrogator coils, will receive only these signals. The variation of these signals with time as the tag passes along the coils axis gives a clear indication of the passage of the ends of the magnetic material through the zero field region.

It will be appreciated that because the interrogation zone can be very narrow, each individual piece of magnetic material can be distinguished from its neighbours, from which it is separated by a small distance. Naturally, the magnetic material will be selected to suit the particular application for which the tag is intended. Suitable magnetic materials are commercially available, as described hereinbefore.

If a tag containing a number of zones or pieces of magnetic material placed along the axis of the label is now considered, it will be appreciated that as each zone or piece of magnetic material passes through the zero-field region, its presence and the positions of its ends can be detected. It then becomes a simple matter to use the lengths and spacings of individual zones or pieces of magnetic material to represent particular code sequences. Many different coding schemes are possible: one efficient arrangement is to use an analogue of the coding scheme used for optical barcodes, where data is represented by the spacing and widths of the lines in the code.

The system so far described allows for the scanning of a single-axis tag (e.g. a wire or a thin strip of anisotropic material, having a magnetic axis along its length) as it physically moves through the coil assembly. It will be appreciated that relative movement between the tag and the interrogating field can be achieved either with the field stationary and the tag moving, or vice versa. If required, the arrangement can be made self-scanning, and thus able to interrogate a stationary tag, e.g. by modulating the d.c. drive currents to the two interrogator coils, so that the zero field region scans over an appropriate portion of the axis of the coils. The extent of this oscillation needs to be at least equal to the maximum dimension of a tag, and should preferably be considerably greater, to avoid the need for precise tag positioning within the interrogation zone.

By using extra coils arranged on the 2 axes orthogonal to the original, tags in random orientations can be read by sequentially field scanning. This involves much greater complexity in the correlation of signals from the three planes, but because of the very high spatial resolution available would be capable of reading many tags simultaneously present in a common interrogation volume. This is of enormous benefit for applications such as tagging everyday retail shopping items, and, for example, would allow automated price totalisation of a bag of shopping at the point of sale. Thus the invention has applicability to the price labelling of articles and to point-of-sale systems which generate a sales total (with or without accompanying inventory-related data processing).

The size of a simple linear tag is dependent on the length of the individual elements, their spacing and the number of data bits required. Using strips of the highest permeability material commercially available, such as the "spin-melt" alloy foils available from suppliers such as Vacuum-schmeltze (Germany) and Allied Signal (USA), the minimum length of individual elements which can be used is probably of the order of a few millimeters. This is because the extrinsic permeability will be dominated by shape factors rather than by the very high intrinsic permeability (typically $10^5$), and shorter lengths may have insufficient permeability for satisfactory operation.

For this reason it is attractive to use very thin films of high permeability magnetic material. Provided it is very thin, (ideally less than 1 $\mu$m), such material can be cut into small 2 dimensional pieces (squares, discs etc) with areas of just 20 mm$^3$ or less, yet still retain high permeability. This will enable shorter tags than possible with elements made from commercially available high-permeability foils. Suitable thin film materials are available commercially from IST (Belgium).

An extension to this type of programming can also be used to prevent the composite tag producing an alarm in a retail security system (such an alarm would be a false indication of theft, and would thus be an embarrassment both to the retailer and to the purchaser). If different regions of the tag are biased with different static field levels, they will produce signals at different times when they pass through retail security systems. This will complicate the label signature in such systems and prevent an alarm being caused. In the present invention, the reading system will be able to handle the time-shifted signals caused by such magnetic biassing.

Thus far tag coding has been described on the basis of physically separated magnetic elements. It is not essential, however, to physically separate the elements; programming of data onto a tag may be accomplished by destroying the high-permeability properties of a continuous magnetic element in selected regions thereof. This can be done, for example, by local heating to above the recrystallisation temperature of the amorphous alloy, or by stamping or otherwise working the material. Of even more importance is the ability to magnetically isolate regions of a continuous element of high permeability material by means of a magnetic pattern stored on an adjacent bias element made from medium or high coercivity magnetic material. Such a composite tag could then be simply coded by writing a magnetic pattern onto the bias element using a suitable magnetic recording head. If required, the tag could then be erased (by de-gaussing with an AC field) and re-programmed with new data.

The scheme described can also be extended to operate with tags storing data in two dimensions. This allows for much more compact tags, since as well as being a more convenient form, a tag made up from an N×N array of thin-film patches has much more coding potential than a linear array of the same number of patches. This is because there are many more unique patch inter-relationships that can be set up in a given area.

FURTHER EMBODIMENTS
Use of Spatial Magnetic Scanning for Position Sensing

In addition to interrogating space to read data tags, this new technique of moving planes of zero field through space (or moving things through the planes) can be used to provide accurate location information for small items of high permeability magnetic material.

Thus, according to another aspect, the invention provides a method of determining the precise location of an object, characterised in that the method comprises: (a) securing to the object a small piece of a magnetic material which is of high magnetic permeability; (b) applying to the region in which said object is located a magnetic field comprising two opposed field components, generated by magnetic field sources, which result in a null field at a position intermediate said magnetic field sources; (c) applying a low amplitude, high frequency interrogating field to said region; (d) causing the position of the null field to sweep slowly back and forth over a predetermined range of movement; (e) observing the magnetic interaction between said applied magnetic field and said small piece of magnetic material; and (f) calculating the position of the object from a consideration of said magnetic interaction and form the known magnetic parameters relating to said applied field and to said small piece of magnetic material. Advantageously, the small piece of high permeability magnetic material is in the form of a thin foil, a wire or a thin film.

This aspect of the invention is of particular interest when the object whose location is to be determined is a surgical instrument, for example a surgical probe or needle. The invention allows precise determination of the location of, for example, a surgical probe during an operation.

This technique is ideal for accurate location of very small markers within relatively confined volumes; it can separately resolve multiple markers. It also displays low sensitivity to extraneous metal objects.

The magnetic tag or marker can typically be a 1 cm length (longer if desired) of amorphous wire (non-corrosive, diameter 90 micron or less) similar to that used in EAS tags or, with suitable process development, a short length (eg 1 cm) of a needle sputter-coated with a thin layer of soft magnetic material.

In use around the head of a patient, resolution to 0.1 mm with the described markers can be achieved accuracy should also have the potential to approach this value if some precautions about calibration and use of other magnetic materials are observed, but for optimum performance a rigid but open structure close to the head would be desired. The magnetic field levels employed will be lower than those generated by every day magnets (eg kitchen door catches etc).

This technique has particular application to brain surgery, where there is the requirement to locate the position of probes in three dimensions and with high precision. It is therefore possible, in accordance with this invention, to use small magnetic markers on such problems or needles. In this case, a key advantage is that the signal from the marker need only be detected and resolved in time; the resolution is determined by the location of the zero field plane, not by the signal to noise ratio of the detected marker signal. This permits a very small marker to be used.

A single axis position sensor may be implemented with a set of coils similar to the tag reading system described above. This comprises: a pair of opposed coils carrying DC current to generate a DC field gradient; a means of applying a relatively uniform low level AC field to drive the marker in and out of saturation in the small region where the DC field is close to zero; and a means of applying a relatively uniform DC field of variable strength and polarity to move the location of the plane of zero DC field around the volume to be interrogated.

An anisotropic marker—i.e. one having a preferential axis of magnetisation—resolves the magnetic field along its length. Such a marker can be obtained, for example, by using a long, thin element of a magnetic material or by suitable treatment of an area of magnetic material having a much lower aspect ratio, e.g. by longitudinally annealing a generally rectangular patch of a spin-melt magnetic material. In the context of the single axis position sensor under discussion there are five degrees of freedom (x, y, z and two angels (rotation of the marker about its axis has no effect)). Three orthogonal complete sets of coils can capture sufficient information by doing three scans of the uniform DC field on each of the sets of coils in turn. The first scan with no field from the other sets, the second with a uniform DC field from one of the other sets, and the third with DC field from the other set. This gives nine scans in all; these may be represented as in the following table, in which the magnetic field sources are identified as a, b and c and the scans are numbered from 1–9 (scanning order being of no significance):

| Orthogonal field source | 1 | 2 | 3 | 4 | 5 | 6 | 7 | 8 | 9 |
| --- | --- | --- | --- | --- | --- | --- | --- | --- | --- |
| a | ON | ON | ON | OFF | OFF | ON | OFF | OFF | ON |
| b | OFF | ON | OFF | ON | ON | ON | OFF | ON | OFF |
| c | OFF | OFF | ON | OFF | ON | OFF | ON | ON | ON |

The only information required from each scan is the position of the centre of the harmonic output from the marker within that scan. These nine DC field values can then be converted into the xyz-theta-phi co-ordinates of the marker. To start with, the system can simply be used by holding the marker in the desired position before the head is put into the coils; and then when the head is placed in the coils the marker can be moved until the same signals are obtained.

An alternative to sequential interrogation which has the advantage of requiring less time to scan the region of interest is to rotate the magnetic field gradient continuously so as to scan all directions of interest. This can be accomplished by driving three sets of coils with appropriate continuous waveforms. For example, a suitable scanning field will be created if coils in the x, y and z planes are driven with currents $I_x$, $I_y$ and $I_z$ given by the equations:

$$I_x = \cos \omega_a t (A \cos \omega_b t - \sin \omega_b t \cdot \sin \omega_c t) - \sin \omega_a t \cdot \cos \omega_c t$$

$$I_y = \sin \omega_a t (A \cos \omega_b t - \sin \omega_b t \cdot \sin \omega_c t) + \cos \omega_1 t \cdot \cos \omega_c t$$

$$I_z = A \sin \omega_b t + \cos \omega_b t \cdot \sin \omega_c t$$

where:

$\omega_a$ = overall frequency of rotation of applied magnetic field $\omega_b$ = null scanning frequency $\omega_c$ = interrogation frequency A = amplitude ratio $\omega_b : \omega_c$.

Typical (but non-limiting) values of these parameters are:
A=10;
frequency ration $\omega_a:\omega_b$=1:10; and
frequency ratio $\omega_b:\omega_c$=1:400.

DESCRIPTION OF THE DRAWINGS

The invention will now be illustrated with reference to the accompanying drawings, in which:

FIG. 1 illustrates the fundamental elements of a tag reading system of the invention;

FIG. 2 is a circuit diagram illustrating one mode of generating the desired magnetic field pattern with the arrangement of FIG. 1;

FIG. 3 relates the magnetic response of a tag to its position within the reading system of FIG. 1;

DETAILED DESCRIPTION OF PREFERRED EMBODIMENTS

Figure 9A:
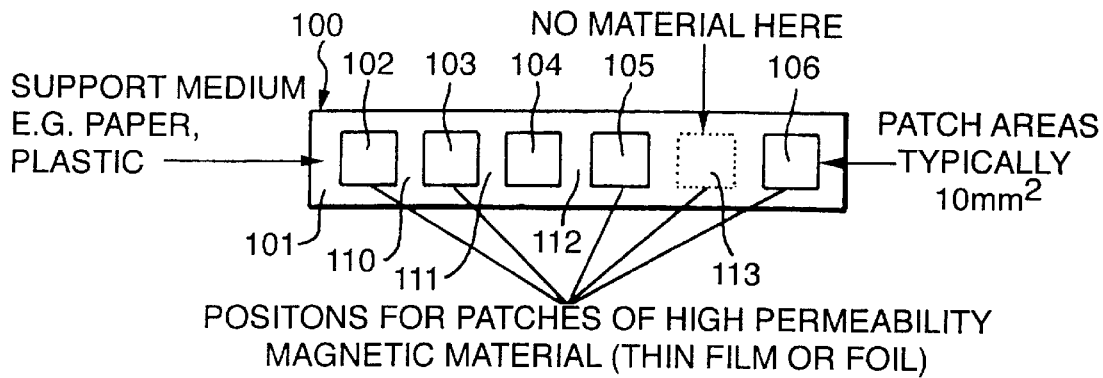
FIG. 9 illustrates a selection of tags in accordance with this invention.

Referring to FIG. 1, a schematic arrangement is shown in which a tag 1 is positioned mid-way between two coils Tx1 and Tx2. The tag is of the type shown in FIG. 9a, i.e. a simple linear tag carrying a plurality of magnetic elements each of which is a high-permeability magnetic alloy material, for example Vacuumschmeltze 6025 spin melt ribbon having an intrinsic permeability of about $10^5$. The reader will appreciate that the values given in this description for the various parameters associated with the elements shown in FIG. 1 are given merely by way of example, and illustrate one working embodiment. The values of these parameters will inevitably vary according to the overall size of the system and its intended function. The magnetic elements which constitute the discrete magnetically active regions of the tag have dimensions 10 mm×1 mm×25 microns; the spacing between adjacent elements is 1 mm. The two coils are spaced apart by approximately 20 cm and each comprise 450 turns of 0.56 mm copper wire wound in a square configuration typically 45 cm×45 cm. Each coil has resistance of 6 ω and an inductance of 100 mH. Each of the coils Tx1 and Tx2 carries a direct current I superimposed upon which is a smaller alternating current i; typically, the direct current I is of the order of 3 A while the superimposed alternating current i is of the order of 50 mA. The alternating current i is of relatively high frequency, typically about 2 kHz.

With a system such as that just described, the alternating and direct currents in the two coils generate a magnetic field pattern in which there is a magnetic null in the direction of arrow x at points lying in a plane parallel to the two coils and mid-way between them. In FIG. 1, the x- and y-coordinates of this mid-way plane are represented by the lines 2 and 3, respectively.

If a magnetic tag of this invention is passed through the two coils shown in FIG. 1, travelling in direction x and generally along the longitudinal axis defined between the center points of the two coils, it will pass through a magnetic field polarity inversion at the mid-way plane defined by coordinates 2 and 3. The change in polarity of the magnetic field comes about because the DC current flows in one sense in the first of the coils and in the opposite sense in the other of the coils, as indicated by the bold arrows in FIG. 1. At the mid-way plane, the magnetic field component generated by the direct current flowing in the first coil exactly cancels the magnetic field component generated by the direct current flowing in the other coil.

As the tag travels through the centre of the first coil, it experiences a high magnetic field which is sufficient to saturate its magnetically active elements; as the field strength decreases on moving towards the mid-way plane, the magnetic material is influenced by the decreasing magnetic field in a way dictated by its hysteresis curve. In the vicinity of the magnetic null, the direction of magnetisation of the magnetic elements of the tag is reversed.

The relatively high frequency alternating current i shown in FIG. 1 is identical in each of the coils Tx1 and Tx2.

The alternating current can have a frequency within a wide range, as indicated hereinbefore; a typical operating value with the arrangement of FIG. 1 is about 2 kHz. The effect of this relatively low amplitude alternating current is to cause the mid-way plane defined by coordinates 2, 3 to oscillate about the geometric midpoint along the longitudinal axis defined between the midpoints of the two coils. In other words, the plane containing the magnetic null oscillates or wobbles back and forth over a small spatial region at the frequency of the alternating current.

FIG. 2 shows a simple circuit for providing opposed DC fields combined with AC fields. Capacitor C1 is selected to resonate with the inductance of coils Tx1 and Tx2 at the AC drive frequency; each of these coils has a resistance of 6 ohms and an inductance of 100 millihenries. A typical value for C1 is 0.1 $\mu$F. C2 is a capacitor selected to behave as an effective short-circuit at the AC drive frequency; a typical value for this component is 22 $\mu$F. The DC power supply will typically provide 30 volts at 3 amps; and the AC source will typically deliver an alternating current at a frequency of 2 kHz at 2 v rms.

FIG. 3 illustrates how the magnetisation of a single magnetic element varies with time at different positions within the magnetic field pattern defined between the coils Tx1 and Tx2 of FIG. 2. For ease of illustration, the oscillation of the plane containing the magnetic null is represented by the bold double-headed arrow (⇋) 4, the extreme positions of the plane being represented by dashed lines 5 and 6, respectively, and the mid-point between limiting planes 5 and 6 being represented by dashed line 7. In the right hand portion of FIG. 3, the applied AC field is shown varying with time between positive (H+) and negative (H−) field values. Beneath the graph of the applied AC field, there are five graphs depicting how the net magnetisation of the magnetic element varies with time in each of five geometric positions indicated to the left as Position 1, Position 2, etc. Planes 5 and 6 define the limits of regions within which magnetic field polarity reversals occur. In practice, the separation between planes 5 and 6 is typically of the order of 1 mm; for a given magnetic material, this distance can be increased or decreased at will within certain limits by varying the amplitude of the AC current and/or the DC current in the coils.

At all times, the magnetic element has a linear magnetic axis which is orthogonal to the planes 5, 6 and 7.

In Position 1, the end of the magnetic element is adjacent to plane 6; in this condition, it experiences a positive magnetic field at all times and tis net magnetisation is time-invariant. In Position 2, the leading end of the element has reached the mid-way plane 7. Most of the magnetic material, however, still remains outside limiting plane 6. In consequence, the null plane is able to interact with only a portion of the magnetic material, resulting in a time-variable net magnetisation having the repeat pattern shown, i.e. a straight line positive-value portion followed by a generally sinusoidal arc which dips towards zero and then rises to its original positive value.

In Position 3, the magnetic material is positioned symmetrically with respect to the mid-way plane 7. Here, the net magnetisation versus time plot consists of a sine wave whose frequency corresponds to that of the applied AC field. In Position 4, the majority of the magnetic element experiences a negative field at all times, while a smaller part of the element experiences polarity reversals; this leads to the net magnetisation versus time plot as shown. The fact that Position 4 is in effect the inverse of Position 2 is reflected in the relationship between the magnetisation plots for these two positions; as can be seen, the plot for Position 4 is effectively a mirror image of that for Position 2 but with the curved portions time-shifted.

Finally, that Position 5, all of the tag experiences the negative field, and no part of the tag experiences field polarity reversal. In consequence, the net magnetisation is time-invariant, being a constant negative value as shown.

When a tag containing such a magnetic element is passed along the coils' axis through the region of zero field, it will initially be completely saturated by the DC magnetic field, It will next briefly be driven over its B-H loop as it passes through the zero field region. Finally it will become saturated again. The portion of the traverse over which the magnetic material is "active", i.e. is undergoing magnetic changes, is physically small, and is determined by the amplitude of the DC field, the amplitude of the AC field, and the characteristics of the magnetic material. This region can easily be less than 1 mm in extent. If the level of the alternating field is well below that required to saturate the magnetic material in the tag, then harmonics of the AC signal will be generated by the tag as it enters the zero field region (Positions 1 to 2) and responds to the changing field. As the tag straddles the narrow zero field region (Position 3) the tag will be driven on the linear part of its B-H loop, and will interact byre-radiating only the fundamental interrogation frequency. Then, as the tag leaves the zero field region, (Positions 4 to 5) it will again emit harmonics of the interrogation field frequency.

A receiver (Rx) coil arranged to be sensitive to fields produced at the zero field region, but which does not couple directly to the interrogator (Tx) coils, will receive only these signals. Such an arrangement can be achieved by using separate Tx and Rx coils physically arranged to have low mutual coupling; or by using a single coil (having both Tx and Rx functions) together with suitable filtering in the Tx and Rx paths. The variation of these signals with time as the tag passes along the coils' axis gives a clear indication of the passage of the ends of the magnetic material through the zero field region.

The result of this interaction between the tag and the magnetic field it experiences is shown in FIG. 3b. Here, the region 4 over which the magnetic null oscillates is shown on a smaller scale, and the numbered dots represent the location of the mid-point of the tag in each of Positions 1–5. The generation of a harmonic signal by the tag (illustrated by the second harmonic of the applied frequency) is apparent at positions where the tag enters the region defined by limiting planes 5 and 6, i.e. the zone where magnetic field polarity reversals occur. Because of the symmetry of the system, a single magnetic element will generate a doublet peak 8a and 8b since Positions 2 and 4 are redundant.

Figure 4:
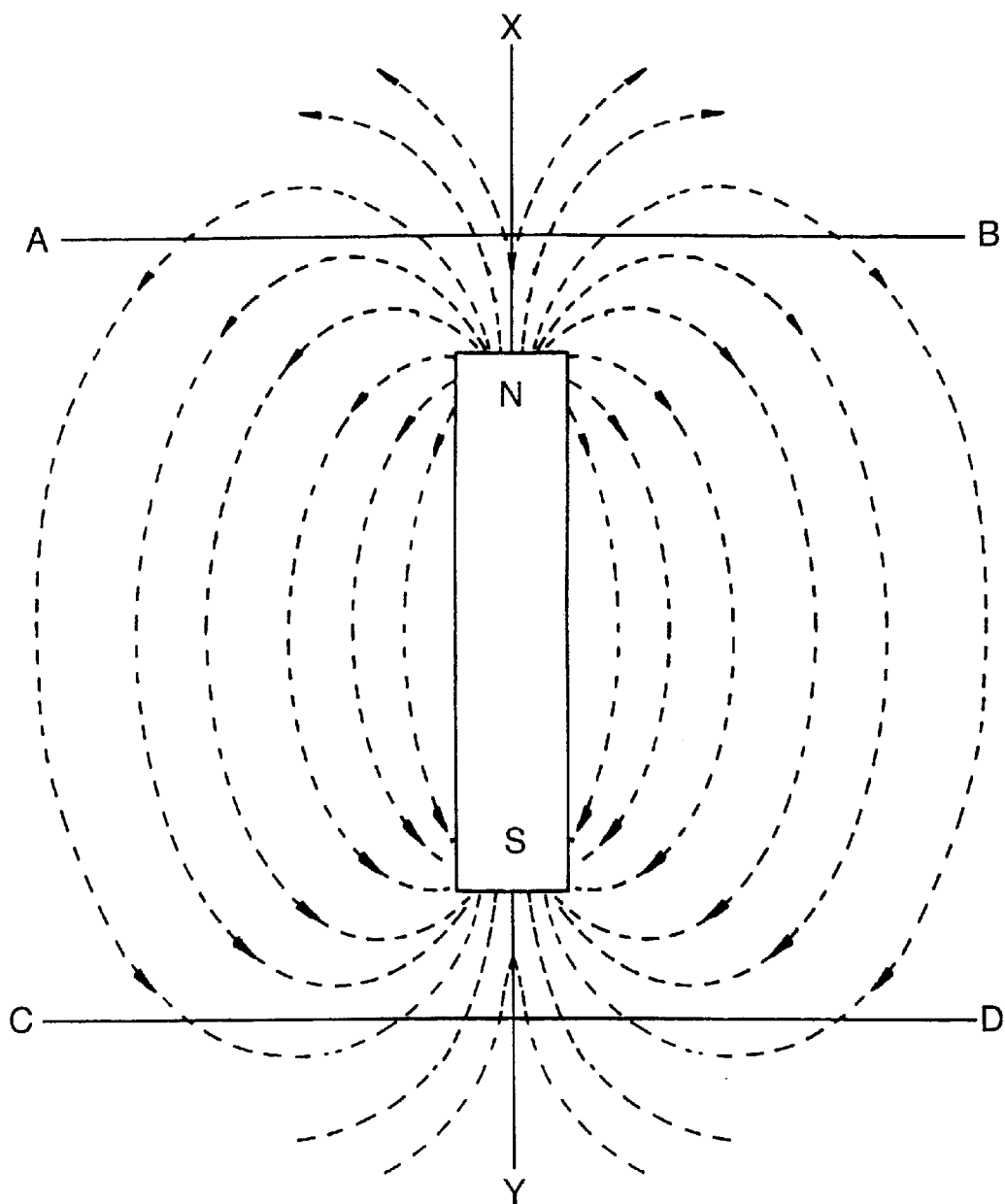
FIG. 4 illustrates where magnetic nulls occur with a permanent magnet.

Referring now to FIG. 4, this illustrates the lines of force (i.e. the magnetic contours) existing with a simple bar magnet. The plane X-Y which intersects the longitudinal axis of the bar magnet and which is orthogonal to the plane of the paper constitutes a magnetic null plane. Thus a magnetic element possessing a sensitive magnetic axis aligned orthogonally with respect to the null plane will experience a magnetic null as it traverses either path A-B or path C-D. Consequently a simple bar magnet can be used as part of an interrogation system to detect the presence of such a magnetic tag, or to read information carried by such a tag.

The generation of second harmonic signal can form the basis of a tag detection system. If, instead of just a single magnetic element the tag includes a linear array of n magnetic elements, the second harmonic output from the tag will comprise n duplet peaks, each of the type shown in FIG. 3b. If the size and magnetic characteristics of the magnetic elements are all the same, the peaks will have the same profile and each peak will define an envelope of constant area. The spacing between individual magnetic elements will influence the relative positions of the duplet peaks on an amplitude versus time plot. It will be appreciated that the present invention is not restricted to the use of such simple tags as just described. The use of magnetic elements of different sizes and magnetic characteristics, and with non-uniform spacing along the length of the magnetic tag, will generate more complex signal patterns which nevertheless are characteristic of the given tag construction. By varying the number, the magnetic characteristics, and the positioning of a series of magnetic elements, it is possible to manufacture a very large number of magnetic tags each with its own unique characteristics which will accordingly generate a unique signal when used in conjunction with the system of FIGS. 1–3.

It will also be appreciated that the invention is not limited to observing the second harmonic of the applied alternating frequency; this particular harmonic has been selected for the purposes of illustration since it is relatively easy to generate a transmit signal (Tx output) which has no (or very little) second harmonic content, thus permitting good discrimination between the Tx signal and the response of the tag; and since it also contains a relatively high proportion of the total harmonic energy output from the tag.

Figure 5:
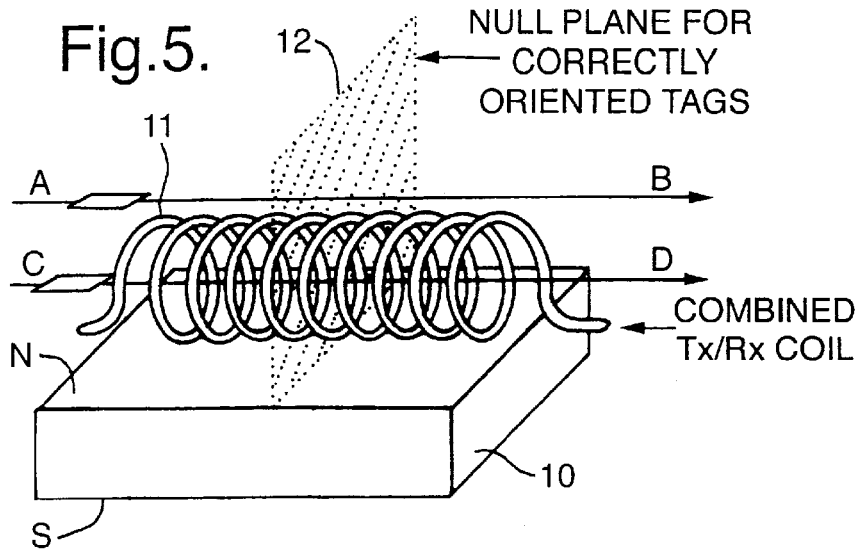
FIG. 5 illustrates an embodiment of the invention which utilises a coil and a permanent magnet to generate the desired field pattern.

Referring next to FIG. 5, there is shown a schematic arrangement for a simple tag reader in accordance with this invention, the reader utilising a permanent magnet 10 and a coil 11 located adjacent to one face of the magnet. In this embodiment, a tag which is to be read can be passed along path C-D through coil 11 or along path A-B above the coil. The tags must be oriented with their magnetic axis aligned with the direction of tag movement. In FIG. 5, the magnetic null plane is positioned at 12 as shown.

Figure 6:
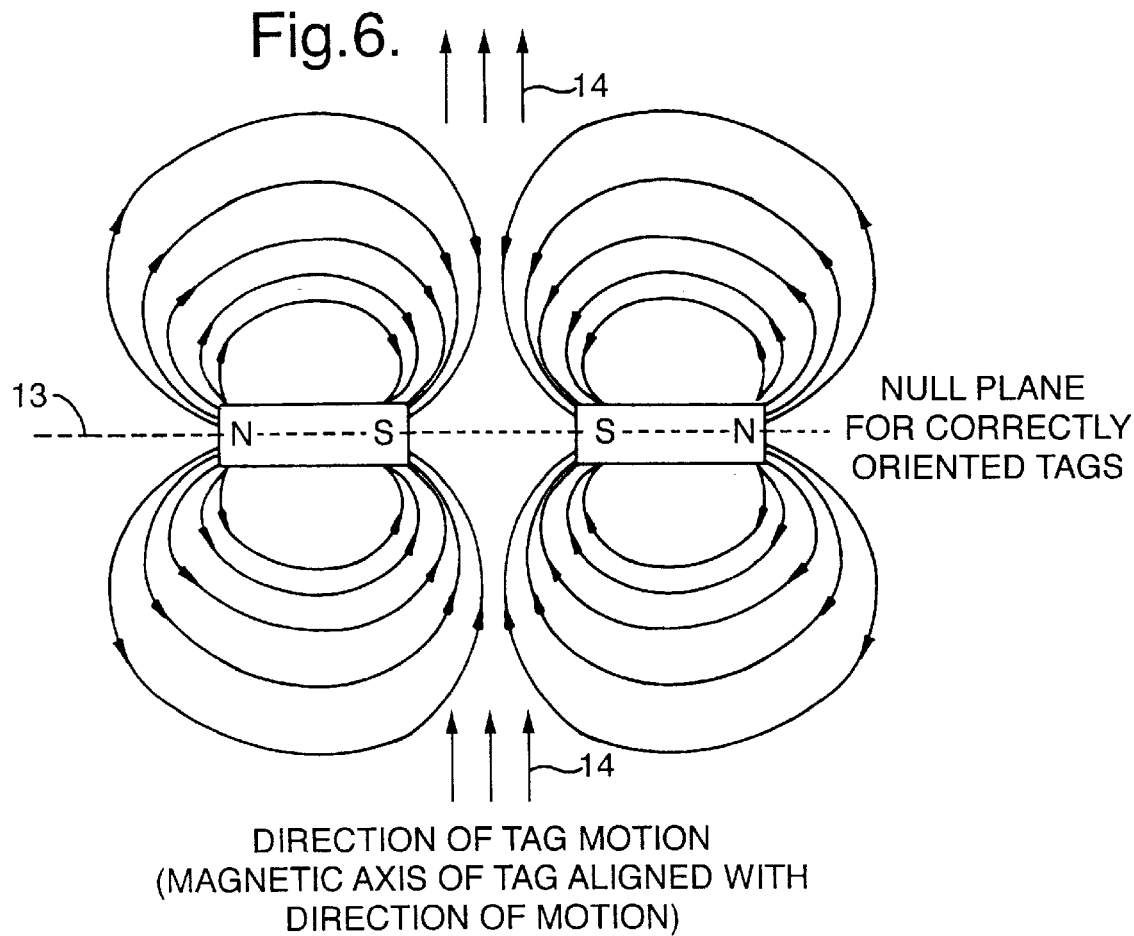
FIG. 6 illustrates an embodiment of the invention which utilises a pair of permanent magnets to generate the desired field pattern.

Referring next to FIG. 6, the use of two permanent magnets positioned with their magnetic axes aligned and with like poles opposing one another is illustrated. Such an arrangement generates a null plane 13; the direction of tag motion required is indicated by arrows 14. Again, the magnetic axis of the tag must be aligned with the direction of movement.

Figure 7:
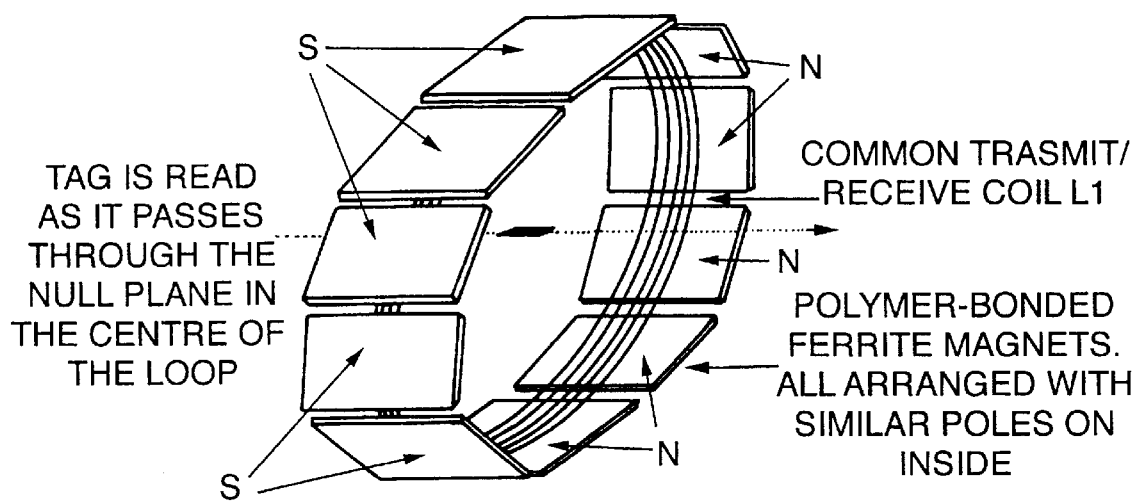
FIG. 7 illustrates an embodiment of the invention which utilises a plurality of permanent magnets disposed in an annular array with a coil to generate the desired field pattern.

FIG. 7 shows a simple relisation of a tag reader head using a plurality of permanent magnets to generate a magnetic null plane. As illustrated, ten polymer-bonded ferrite magnets are disposed in an annular array with like poles facing inwards. A common transmit/receive coil L1 sits within the annulus of magnets in the manner indicated. The tag is read as it passes through the null plane in the centre of the loop of magnets.

Figure 8:
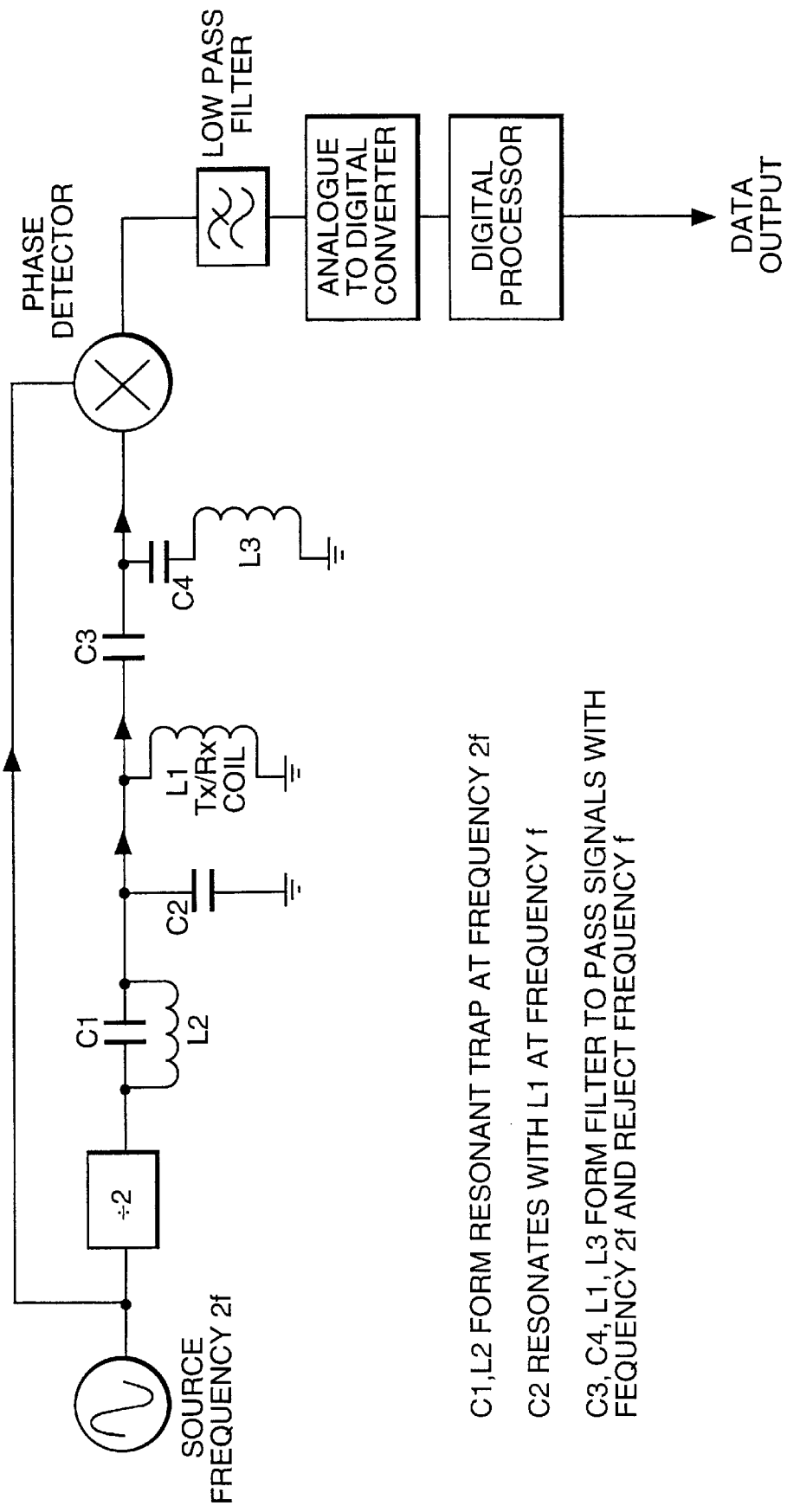
FIG. 8 is a schematic circuit diagram for one embodiment of a tag interrogator in accordance with the invention.

Referring next to FIG. 8, there is shown one embodiment of an interrogation system in accordance with this invention., This is based on the use of a single coil L1 to act as both transmitter (Tx) coil, which generates the desired magnetic field pattern, and as the receiver (Rx) coil. The system sues the second harmonic output of the tag as the basis for tag detection/identification. Circuit components C1 and L2 form a resonant trap at frequency 2f to reduce signals at this frequency in the Tx output to a very low level; C2 resonates with L1 at frequency f; and components C3, C4, L1 and L3 form a filter to pass wanted signals from the tag at frequency 2F while rejecting signals at the transmitted frequency f.

The output obtained from this circuit passes through a low pas filter to an analogue to digital converter (ADC) and thence to a digital signal processor. These components, and in particular the signal processor, will be configured to suit the intended application of the interrogation unit. The nature of the signal processing, and the means by which it is achieved, are all conventional and therefore will not be described further here.

FIG. 9 illustrates the basic structure of magnetic tags in accordance with the invention. FIG. 9a shows a tag 100 which comprises a support medium 101 (e.g. paper or a plastic material) and a linear array of magnetically active regions 102, 103, 104, 105 and 106. Each magnetically active region is formed from a patch of high-permeability magnetic material (e.g. Vacuumschmeltze 6025) having its magnetic axis aligned along the length of the tag. Each patch is about 10 mm$^2$ in area and is adhesively secured to the substrate 101.

Patches 102–105 are identical in dimensions and magnetic properties, and are uniformly spaced apart, gaps 110, 111 and 112 all being the same. The gap between patches 105 and 106, however, is larger—as though there were one patch missing at the position indicated by dotted lines at 113.

Tag 100 behaves as a six-bit tag, coded 111101 (the zero being area 113).

A functionally equivalent tag 120 is formed of a substrate 121 carrying magnetic elements 122–126 and having a "gap" 127; in this embodiment, the magnetic elements are in the form of a strip or wire of high-permeability magnetic material (e.g. Vacuumschmeltze 6025), typically being about 5 mm long, 1 mm wide and about 15 microns in thickness.

Figure 9B:
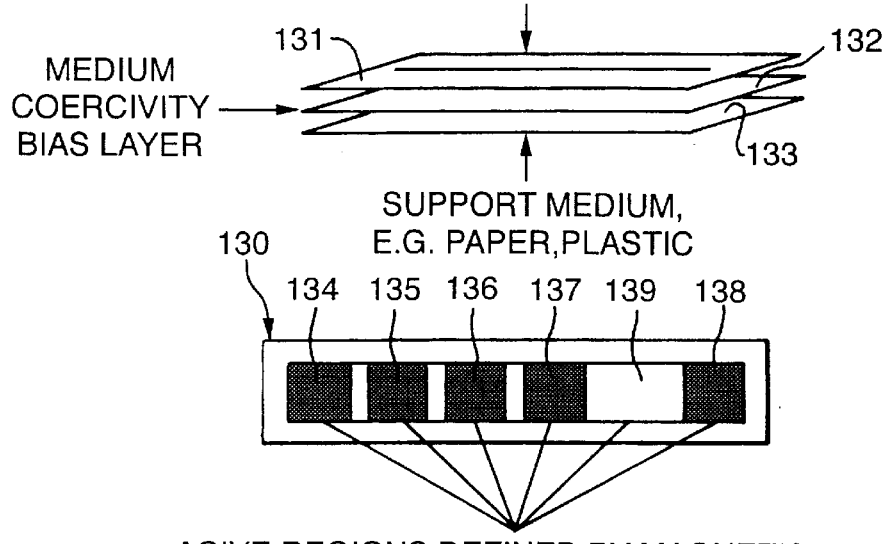

FIG. 9b illustrates an alternative construction for a six-bit, laminated tag 130. This tag is coded 111101, as in FIG. 9a. Here, a continuous layer or length of high permeability magnetic material 131 (in the form of wire, strip, thin film or foil) and a substrate 133 having sandwiched between them a magnetic bias layer 132. The bias layer is magnetised in predetermined areas which influence the overlying high permeability material to generate magnetically active regions indicated as 134, 135, 136, 137 and 138. Region 139 is not active, and thus constitutes a magnetic zero. When read by an interrogation system such as that of FIG. 8, the output generated by tags 100, 120 and 130 will be as shown in FIG. 9d.

Figure 9C:
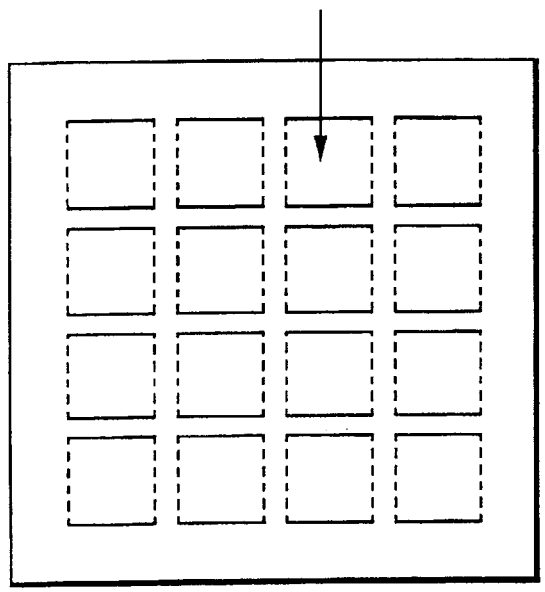
Figure 9D:
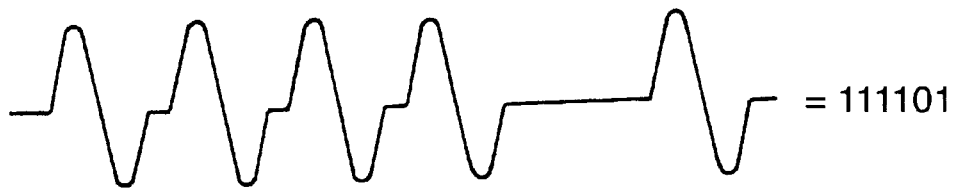

A more complex tag is shown in FIG. 9c. Here there are a series of parallel linear arrays of magnetically active material, generating a 4×4 array of sites where the magnetically active material may be present (coding as '1') or absent (coding as '0').

Figure 10:
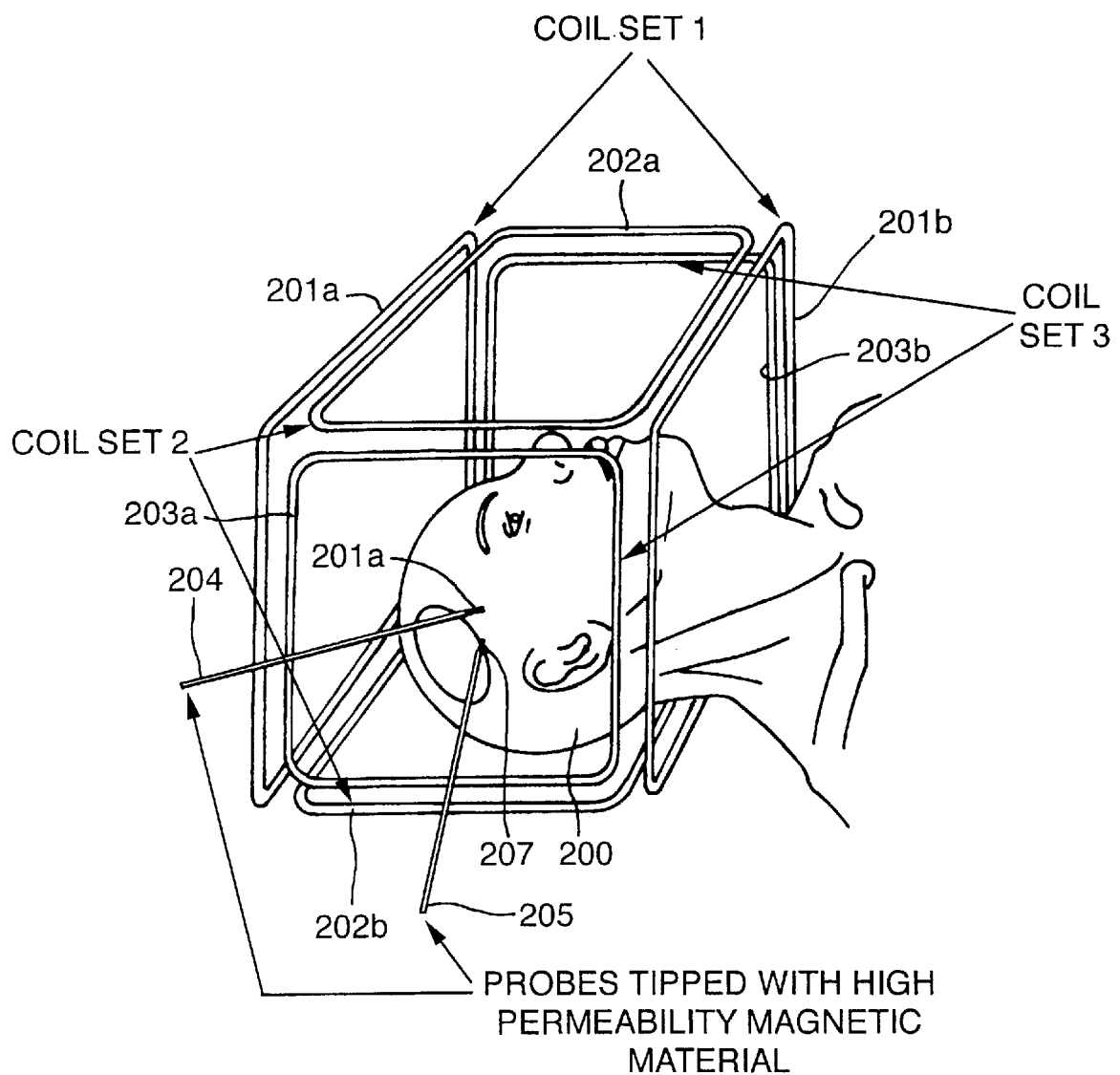
FIG. 10 illustrates an embodiment of the invention as applied to surgical operations.

FIG. 10 illustrates the general arrangement of three sets of coils as used in accordance with this invention for surgical applications. The three sets of coils are all mutually orthogonal and define a cavity into which the head 200 of a patient may be positioned. The first coil set consists of coils 201a and 201b; the second set consists of coils 202a and 202b; and the third set consists of coils 203a and 203b. In the drawing, two surgical probes 204 and 205 are shown schematically in position within the patient's cranium. The probes each have, at their distal ends, a magnetic tag 206, 207 such as one of those described with reference to FIG. 9 above. Because the magnetic element of the tag is only required to provide information of its presence (rather than hold extensive data), relatively simple tags are preferred. A single magnetic element of high permeability magnetic material located at the tip of the probe is sufficient. The coils are operated in the manner described in detail hereinabove. By means of the present invention, it is possible to determine the positions of the ends of the probes with high precision—and thus to carry out delicate surgical procedures with accuracy and with minimum damage to healthy tissue.

I claim:

1. A method of determining the position of a magnetic element, or the relative positions of two or more magnetic elements on a tag, the magnetic element(s) having non-linear magnetic properties and a preferential axis of magnetisation, the method comprising the steps of:

(a) applying a magnetic field to an interrogation zone where the magnetic element(s) is or are located, or is or are expected to be located, said magnetic field being:

(i) generated by magnetic field generating means positioned independently of said magnetic element(s);

(ii) such that there exists within said interrogation zone a first region at which the component of the magnetic field resolved in a first direction is zero, and where in regions contiguous with said first region the component of the magnetic field resolved in said first direction is sufficient to saturate the, or a part of the, magnetic element(s); and (iii) such that said first direction is or can be aligned with the preferential axis of magnetisation of the or each magnetic element;

(b) causing relative movement between said magnetic field and said magnetic element(s) in the direction of the preferential axis of magnetisation of the magnetic element(s) such that at least a portion of the magnetic element, or of each of the magnetic elements in turn, become magnetically saturated and then enters said first region;

(c) detecting the magnetic response of the or each magnetic element during said relative movement; and (d) determining the position of the magnetic element, or the relative positions of the magnetic elements, from the time(s) of occurrence of the or each magnetic response.

2. A method as claimed in claim 1, characterised in that said first region is caused to sweep back and forth within a part of said interrogation zone.

3. A method according to claim 1, characterised in that said relative movement is produced by causing said magnetic element to traverse said interrogation zone within which the required magnetic conditions are generated.

4. A method according to claim 1, characterised in that said relative movement is produced by sweeping the applied magnetic field over the magnetic element.

5. A method according to claim 1, characterised in that said magnetic element is generally elongate and in that the zero field direction of said magnetic field extends along the major axis of said magnetic element during said relative movement.

6. A method according to claim 1, characterised in that said magnetic element is in the form of a thin film or foil and in that the zero field direction of said magnetic field is aligned with the axis of magnetic sensitivity of the film or foil during said relative movement.

7. A method as claimed in claim 1, characterised in that said magnetic field is established by the application to said interrogation zone of two magnetic fields of opposite polarity.

8. A method as claimed in claim 7, characterised in that the application of said two magnetic fields is achieved by use of one or more coils carrying direct current.

9. A method according to claim 8, characterised in that said coil(s) carry/carries a substantially constant current.

10. A method according to claim 8, characterised in that said coil(s) carry/carries a current whose magnitude carries in a predetermined cycle so that the position of said first region is caused to oscillate in a predetermined manner.

11. A method as claimed in claim 1, characterised in that said magnetic field is established by the use of one or more permanent magnets.

12. A method according to claim 11, characterised in that said permanent magnet(s) is or are accompanied by a coil or coils which carry or carries a current whose magnitude varies according to a predetermined cycle so that the position said first region is caused to oscillate in a predetermined manner.

13. A method as claimed in claim 1, characterised in that said relative movement is caused by the application of an alternating magnetic field to said magnetic field.

14. A method according to claim 13, characterised in that relative movement between said magnetic field and said magnetic element is caused by applying a relatively low amplitude alternating magnetic field superimposed on a DC field.

15. A method according to claim 14, characterised in that said relatively low amplitude alternating magnetic field has a frequency in the range from 10 Hz to 100 kHz.

16. A method according to claim 1, characterized in that detection of the magnetic response of said magnetic element comprises observation of harmonics which are generated by the magnetic element from an applied AC field as its magnetisation state is altered by passing through said first region.

17. A method of determining the location of an object, which comprises the steps of:
(a) securing to the object at least one magnetic element in the form of a small piece of a magnetic material having non-linear magnetic properties and a preferential axis of magnetisation,
(b) applying a magnetic field to an interrogation zone where the magnetic element(s) is or are located, or is or are expected to be located, said magnetic field being:
  (i) generated by magnetic field generating means positioned independently of said magnetic element(s);
  (ii) such that there exists within said interrogation zone a first region at which the component of the magnetic field resolved in a first direction is zero, and wherein in regions contiguous with said first region the component of the magnetic field resolve din said first direction is sufficient to saturate the, or part of the, magnetic element(s); and
  (iii) such that said first direction is or can be aligned with the preferential axis of magnetisation of the or each magnetic element;
(c) causing relative movement between said magnetic field and said magnetic element(s) in the direction of the preferential axis of magnetisation of the magnetic element(s) such that at least a portion of said magnetic element(s) becomes magnetically saturated and then enters said first region;
(d) detecting the response of the magnetic element(s); and
(e) calculating the position of the object from a consideration of said magnetic response and from the known parameters relating to said applied field and to the properties of the said magnetic material.

18. A method according to claim 17, characterised in that the magnetic field is caused to traverse the magnetic material repeatedly as a result of the application of a low amplitude, high frequency interrogating magnetic field to said interrogation zone.

19. A method according to claim 17, characterised in that the magnetic field is generated by three sets of mutually orthogonal magnetic field sources, and then calculating, for each scan, the position of the center of the harmonic output from the magnetic material.

20. A method according to claim 19, characterised in that three orthogonal coil sets are continuously excited so as to create a continuously rotating field direction which covers the volume of interest in controlled sweeps of predetermined width.

21. A method of totalising data from an assembly of individual articles, each carrying a magnetic tag having a particular spatial arrangement of magnetic zones, said spatial arrangement being chosen such that the lengths and spacings between the zones represent a particular code sequence unique to that article and others sharing the same data value, characterised in that the assembly of articles is caused to move through a interrogation zone where the assembly is subjected to a series of steps comprising:
(i) applying to each article a small piece of magnetic material;
(ii) applying to the interrogation zone a magnetic field in which there exists a first region, where the component of the magnetic field resolved in a first direction is zero, and a region contiguous with said first region, in which the component of the magnetic field resolved in said first direction is sufficient to saturate the, or part of the, magnetic zones;
(iii) for each article,
  (a) causing relative movement between said article and said magnetic field such that each of the said magnetic zones of the tag are traversed by the magnetic field or vide versa;
  (b) observing the magnetic interaction between said applied magnetic field and said magnetic zones;
  (c) determining the relative positions of the magnetic zones from the relative times of occurrence of the or each magnetic interaction; and
  (d) deducing the unique article identity and hence its data value, from the determined positions of the said magnetic zones by reference to the spatial arrangement chosen to encode the tag; and
(iv) summing the data values of the individual articles.

* * * * *